United States Patent
Hopkins

[11] Patent Number: 5,333,580
[45] Date of Patent: Aug. 2, 1994

[54] STARTER INPUT SHAFT

[75] Inventor: John W. Hopkins, Charlotte, N.C.

[73] Assignee: Textron Inc., Providence, R.I.

[21] Appl. No.: 11,266

[22] Filed: Jan. 29, 1993

[51] Int. Cl.$^5$ .............................................. F02N 3/02
[52] U.S. Cl. ................................... 123/185.3; 74/6; 74/595; 74/598
[58] Field of Search ............. 123/185.3, 185.4, 197.4; 74/6, 598, 595, 597

[56] References Cited

U.S. PATENT DOCUMENTS

| | | | |
|---|---|---|---|
| 1,753,196 | 4/1930 | Becker | 74/598 |
| 2,204,750 | 6/1940 | Conover | 185/39 |
| 2,480,550 | 8/1949 | Catlin | 123/179 |
| 2,597,334 | 5/1952 | Johnson | 123/185 |
| 3,147,638 | 9/1964 | Rice | 74/598 |
| 3,747,649 | 7/1973 | Densow et al. | 123/185.3 |
| 3,782,355 | 1/1974 | Hamman | 123/185 B |
| 3,871,350 | 3/1975 | Hamman | 123/185 A |
| 4,342,236 | 8/1982 | Everts | 74/603 |
| 4,356,605 | 11/1982 | Everts | 29/6 |
| 4,492,190 | 1/1985 | Greenwood et al. | 123/185 A |
| 4,838,116 | 6/1989 | Saito et al. | 74/595 |

*Primary Examiner*—Andrew M. Dolinar
*Attorney, Agent, or Firm*—Perman & Green

[57] ABSTRACT

An internal combustion engine has a crankcase, an output crankshaft, and an input shaft assembly. The input shaft assembly has an input shaft and a crank plate press-fit connected to the input shaft. The crank plate comprises a single sheet metal member with slightly elongate radial slots adapted to receive the crankpin of the output crankshaft. The slots are open ended to allow for misalignment between the output crankshaft and the input shaft whereby the crankpin can longitudinally move in its crank plate slot.

17 Claims, 2 Drawing Sheets

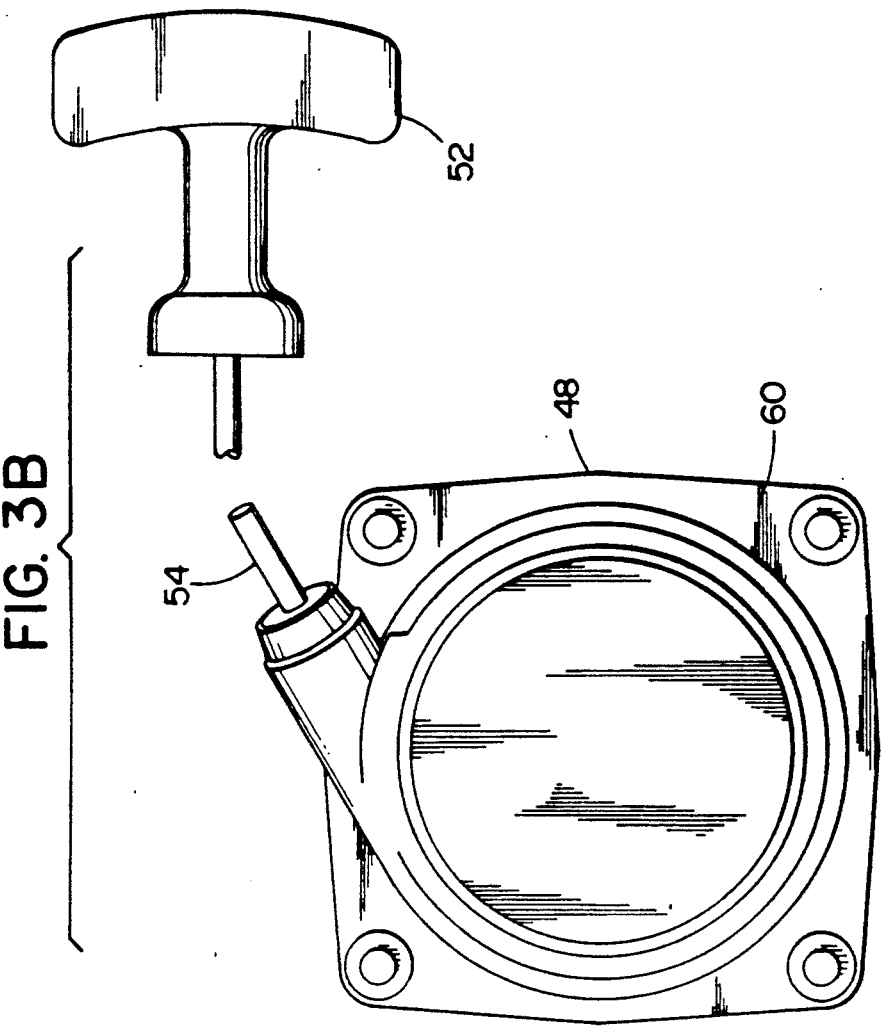
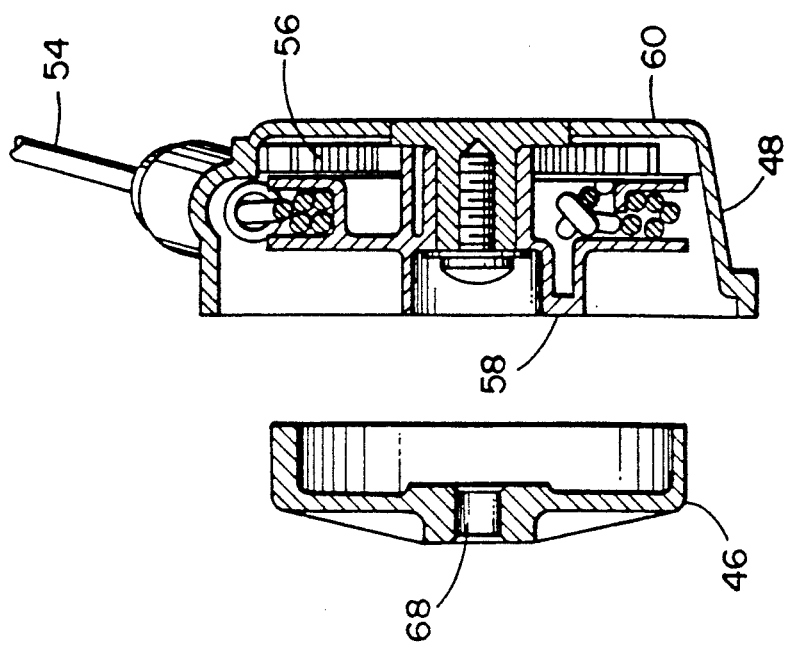

5,333,580

STARTER INPUT SHAFT

BACKGROUND OF THE INVENTION

1. Field of the Invention

The present invention relates to internal combustion engines and, more particularly, to a starter input shaft for a half crankshaft engine.

2. Prior Art

U.S. Pat. Nos. 4,356,605 and 4,342,236 (Everts) disclose a crankshaft with a laminated counterweight. The following patents disclose recoil starters: U.S. Pat. Nos. 4,492,190; 3,871,350; 3,782,355; 2,597,334; 2,480,550; and 2,204,750.

SUMMARY OF THE INVENTION

In accordance with one embodiment of the present invention an internal combustion engine is provided comprising a crankcase, an output crankshaft, and an input shaft assembly. The output crankshaft has an output shaft section and an offset crankpin section. A piston assembly is connected to the offset crankpin section. The input shaft assembly comprises an input shaft and a crank plate fixedly connected to the input shaft. The crank plate is located in the crankcase with an offset slot having an end of the crankpin section located therein.

In accordance with another embodiment of the present invention an internal combustion engine starter and input assembly is provided comprising a recoil starter, a starter cup, an input shaft, and a crank plate. The starter cup is selectively engageable with the recoil starter. The input shaft has a first end fixedly connected to the starter cup. The crank plate is fixedly connected to a second end of the input shaft. The crank plate is comprised of a flat sheet metal member that is press fit mounted to the input shaft second end and having an offset elongate slot adapted to have an end of a crankpin of a crankshaft located therein.

In accordance with another embodiment of the present invention an internal combustion engine shaft assembly is provided comprising a shaft, and a crank plate fixedly connected to the shaft. The crank plate is press fit mounted to an end of the shaft and has an open ended slot therein adapted to receive an end of a crankpin of a crankshaft.

BRIEF DESCRIPTION OF THE DRAWINGS

The foregoing aspects and other features of the invention are explained in the following description, taken in connection with the accompanying drawings, wherein:

FIG. 3A is a cross-sectional view of a recoil starter and starter cup used in the engine shown in FIG. 1.

FIG. 3B is a front end view of the recoil starter shown in FIG. 3A.

DETAILED DESCRIPTION OF THE INVENTION

Figure 1:
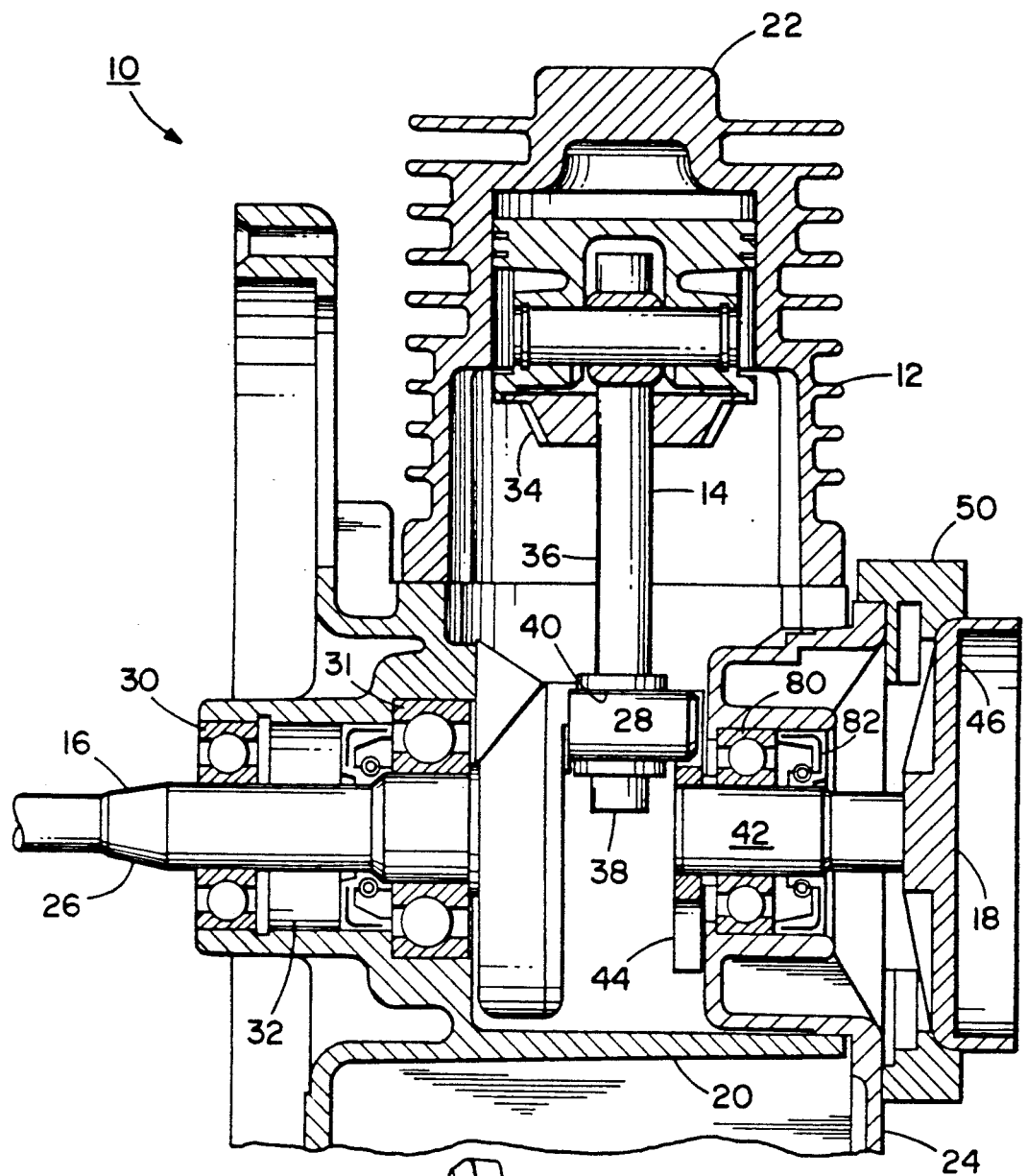
FIG. 1 is a schematic partial cross-sectional view of a portion of an internal combustion engine incorporating features of the present invention.

Referring to FIG. 1, there is shown a schematic partial cross-sectional view of a portion of an internal combustion engine 10 incorporating features of the present invention. Although the present invention will be described with reference to the single embodiment shown in the drawings, it should be understood that the present invention may be embodied in many alternative forms of embodiment. In addition, any suitable size, shape or type of members or materials could be used.

The engine 10 is a simple 2-cycle engine, but the present invention could be used with a 4-cycle engine. The engine 10 has a frame 12, a piston assembly 14, an output crankshaft 16, and an input shaft assembly 18. The frame 12 includes a crankcase 20 and a cylinder-head 22. Of course, the engine 10 includes a suitable fuel supply system and ignition control which is not shown for the sake of clarity. A crankcase cover 24 also forms part of the frame 12. The cover 24 is removably mounted to the crankcase 20 at an aperture into the interior of the crankcase 20, such as by means of bolts.

The output crankshaft 16 includes an output shaft section 26 and an offset crankpin section 28. The crankshaft 16 is preferably made as a unitary member, but may also comprise an assembly of parts. Two bearings 30, 31 are provided to rotatably mount the crankshaft 16 in an aperture 32 of the crankcase 20. Two bearings are provided in order to adequately support the crankshaft 16 due to its weight and the loads it is subjected to by the piston assembly 14. The output shaft section 26 is connected to a suitable driven member or assembly (not shown) such as a string cutter shaft if the engine 10 is being used in a string cutter. However, the engine 10 could be used in any suitable environment. The offset crankpin section 28 is offset from the longitudinal axis of the output shaft section 26. Thus, when the output shaft section 26 is axially rotated, the offset crankpin section 28 moves in a general orbited path inside the crankcase 20.

The piston assembly 14 generally comprises a piston head 34 and a pivotably attached push rod 36. The end 38 of the push rod 36, opposite the piston head 34, has an aperture 40. The aperture 40 is provided to rotatably receive and connect the crankpin section 28 to the push rod 36. Thus, as known in the art, when the piston assembly 14 is pushed down by expanding gases, the push rod axially rotates the crankshaft 16 by its interaction with the crankpin section 28. The weight or inertia of the crankshaft 16 in motion then pushes the piston assembly back to firing position. During this time, the crankpin section 28 rotates in the aperture 40.

Figure 2:
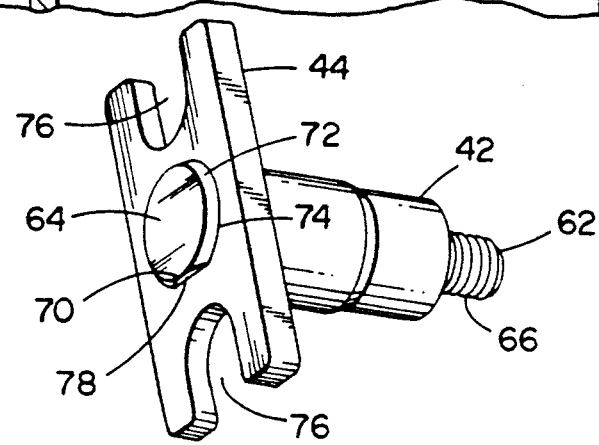
FIG. 2 is a perspective view of a starter shaft assembly shown in FIG. 1 incorporating features of the present invention.

Referring now also to FIGS. 2, 3A and 3B, the input shaft assembly 18 generally comprises an input shaft 42, a crank plate 44, and a starter cup 46. The assembly 18 is used in conjunction with the recoil starter 48 to start the engine 10. The recoil starter 48 is generally known in the art. The starter 48 is fixedly connected to the cover 24 at a mounting block 50, such as by use of screws. The starter 48 has a pull handle 52, line 54, spring 56, and an engaging gear 58 located inside the starter housing 60. The engaging gear 58 is adapted to engage the starter cup 46 when the pull handle 52 is pulled to thereby axially rotate the starter cup 46. The spring 56 is adapted to disengage the gear 58 from the starter cup 46 after the pull handle 52 has been pulled and also recoil the line 54 back into the housing 60.

The input shaft 42 is preferably made of metal and includes a first end 62 and a second end 64. The first end 62 has threads 66 to connect the input shaft 42 to a center aperture 68 of the starter cup 46. However, any suitable means of connecting the input shaft 42 to the starter cup 46 could be provided. The second end 64 of the input shaft 42 includes a notch 70 and a beveled leading edge 72. The crank plate 44 is also preferably made of metal and includes a center aperture 74 and two slightly elongate open ended U-shaped slots 76 offset from the center aperture 74 on opposite ends of the crank plate 44. As seen best in FIG. 2, the crank plate 44 is comprised of a substantially symmetrical flat sheet of metal. The aperture 74 includes a flat section 78 such that the aperture 74 is substantially identical to a cross-section of the input shaft 42. The width of the slots 76 is substantially the same as the cross-sectional width of the crankpin 28. In the embodiment shown, the crank plate 44 is fixedly and stationarily mounted to the second end 64 of the input shaft 42 by means of a press-fit mounting. The input shaft 42 is aligned in front of the center aperture 74 with the notch 70 and flat section 78 aligned. The input shaft 42 and crank plate 44 are then merely pressed together such that the crank plate 44 mounts onto the shaft 42. The beveled leading edge 72 assists in initial mounting. The aperture 74 and outer shape of the shaft 42 at its second end 64 are suitably sized to insure a tight press-fit connection of the crank plate 44 on the shaft 42. The notch 70 and section 78 function as keys to prevent the crank plate 44 from axially rotating on the shaft second end 64. Of course, any suitable type of keying means or anti-rotation means could be provided.

The input shaft 42 is rotatably mounted in the crankcase cover 24 by means of a single bearing 80. However, in an alternative embodiment two or more bearings could be provided for the input shaft 42. A seal 82 is also provided. The crank plate 44 is located inside the crankcase 20 with an end of the crankpin section 28 located in one of the slots 76. The input shaft 42 extends through the crankcase cover 24 and has the starter cup 46 fixedly attached to its second end 62. In the embodiment shown, due to the simple configuration of the input shaft assembly 18, the assembly 18 has a relatively light weight. The assembly 18 is also substantially symmetrical about its axis of rotation. The combination of these factors helps to reduce dynamic forces of the assembly 18 when being rotated. Even more significantly, the improved connection between the crank plate 44 and crankpin section 28 greatly reduces eccentric forces by the crankpin section 28 on the assembly 18. This is accomplished due to the fact that the slots 76 are suitably sized and shaped relative to the end of the crankpin section 28 to allow crankpin section 28 to move in its slot 76. Thus, even if the crankpin section 28 has a slightly irregular path of rotation, this will not substantially affect rotation of the assembly 18 or apply undesired eccentric loads on the assembly 18. This improvement allows the assembly 18 to be mounted to the crankcase cover 24 with only one bearing 80 rather than having to need two bearings as in the prior art. This obviously reduces the cost of manufacturing and assembling the engine 10 compared to prior art engines. The use of a crank plate and merely press-fit mounting of the crank plate to the input shaft also provides a cost effective and efficient assembly when compared to the prior art. Location of the assembly 18 on the opposite side of the piston assembly 14 than the output crankshaft 16 allows for greater engine application flexibility and easier service of the starter system. The crank plate 44 can be made from a simple flat steel stamping or a powder metal part and is symmetric for balance. The U-shaped slots 76 also allow for easy engagement of the crankpin section 28 during assembly and lessen the need for accurate alignment between the input shaft assembly 18 and crankshaft 16. The present invention also reduces eccentric forces on the assembly 18 during starting of the engine 10 by the recoil starter 48. Although the crank plate 44 has been described in some detail above, it should be noted that other embodiments are easily envisioned such as with more or less than two slots, slots that are shaped other than with open ended U-shapes, and slots that do not extend entirely through the crank plate.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An internal combustion engine comprising:
   a crankcase;
   an output crankshaft having an output shaft section and an offset crankpin section;
   a piston assembly connected to the offset crankpin section;
   an input shaft assembly comprising an input shaft and a crank plate fixedly connected to the input shaft, the crank plate being located in the crankcase with an at least two offset slots, one of the slots having an end of the crankpin section located therein.

2. An engine as in claim 1 further comprising a starter cup fixedly connected to the input shaft and a recoil starter operably engageable with the starter cup to rotate the input shaft assembly.

3. An engine as in claim 1 further comprising a crankcase cover connected to the crankcase with the input shaft extending therethrough.

4. An engine as in claim 3 further comprising a single bearing and a shaft seal connected to the crankcase cover between the cover and the input shaft.

5. An engine as in claim 1 wherein at least one of the slots is an open ended slot.

6. An engine as in claim 1 wherein the plate is comprised of a substantially symmetrical flat sheet of metal.

7. An engine as in claim 1 wherein the crank plate is press-fit mounted to the input shaft.

8. An internal combustion engine starter input assembly comprising:
   a recoil starter;
   a starter cup selectively engageable by the recoil starter;
   an input shaft having a first end connected to the starter cup;
   a crank plate fixedly connected to a second end of the input shaft, the crank plate being comprised of a flat sheet metal member with a general symmetrical shape and having two spaced slots, the crank plate being press-fit mounted to the input shaft second end.

9. An assembly as in claim 8 further comprising a crankcase cover with the input shaft rotatably mounted therein.

10. An assembly as in claim 8 wherein at least one of the slots is open ended.

11. An assembly as in claim 8 wherein the crank plate has an asymmetrical center aperture and the second end of the input shaft has a similar shape to help prevent the crank plate from axially rotating on the input shaft.

12. An assembly as in claim 8 wherein the slots are elongate in a radial direction relative to the input shaft.

13. An internal combustion engine shaft assembly comprising:
   a shaft; and
   a crank plate fixedly connected to the shaft, the crank plate being mounted to an end of the shaft and having a general symmetrical shape with two opposite open ended slots and a center aperture with the shaft being located in the center aperture, at least one of the slots being adapted to receive an end of a crankpin of a crankshaft.

14. An assembly as in claim 13 wherein the slots are slightly elongate shaped.

15. An assembly as in claim 13 further comprising means for preventing the crank plate from rotating on the shaft.

16. An internal combustion engine comprising:
   a piston assembly;
   a single counterweight crankshaft having a crankpin connected to the piston assembly, the crankshaft comprising substantially the entire counterweight for the piston assembly; and
   a starter shaft having a shaft section and a crank section, the crank section having a general symmetrical shape with at least two slots, an end of the crankpin being located in one of the slots.

17. An internal combustion engine comprising:
   a piston assembly;
   a crankshaft having a crankpin connected to the piston assembly; and
   a starter shaft assembly having an input shaft and a crank plate fixedly connected to the input shaft, the crank plate being mounted to an end of the input shaft and having a slot with an end of the crankpin located therein, wherein the crank plate has an asymmetrical center aperture and the end of the input shaft has a similar shape to help prevent the crank plate from axially rotating on the input shaft.

* * * * *